Aug. 11, 1936.  C. L. CHARLES  2,050,421
REVERSE GEAR VALVE
Filed Aug. 3, 1932   4 Sheets-Sheet 2
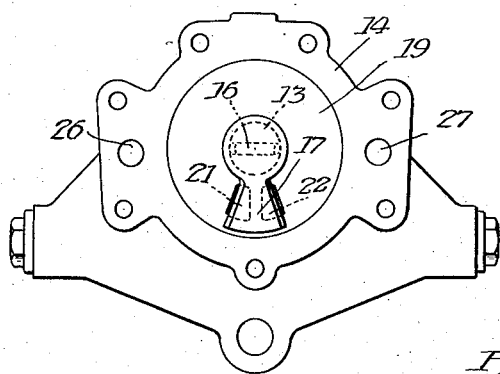
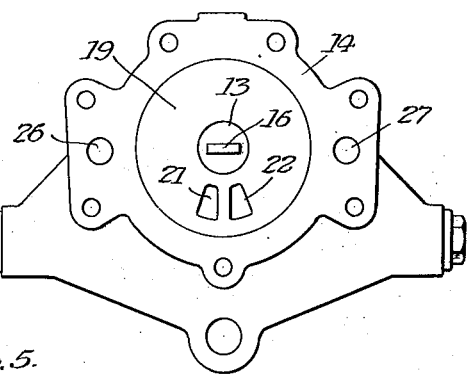
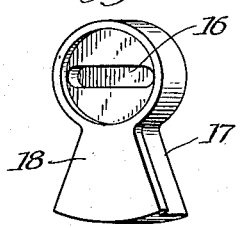
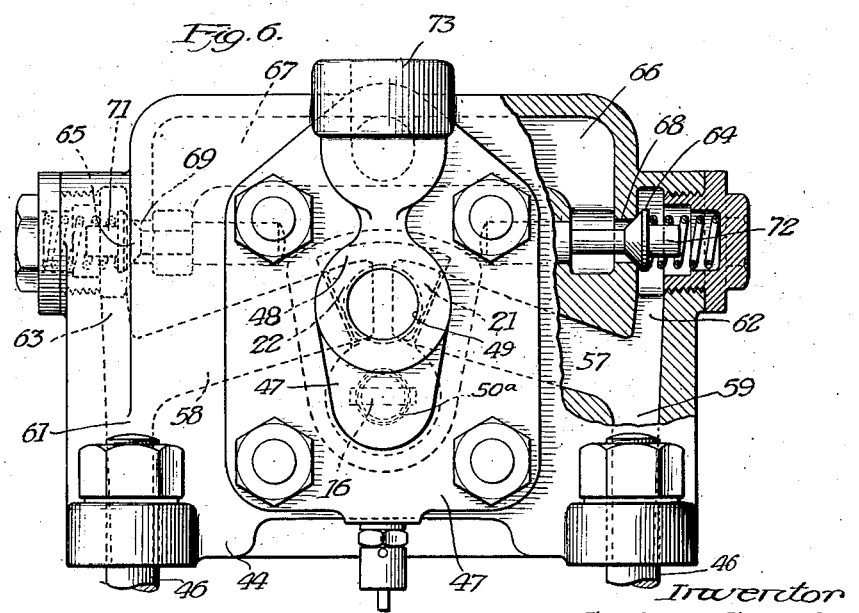
Inventor
Carl L. Charles
By Wilson, Dowell, McCanna & Rehm
Attys.
Witness
R. B. Davison

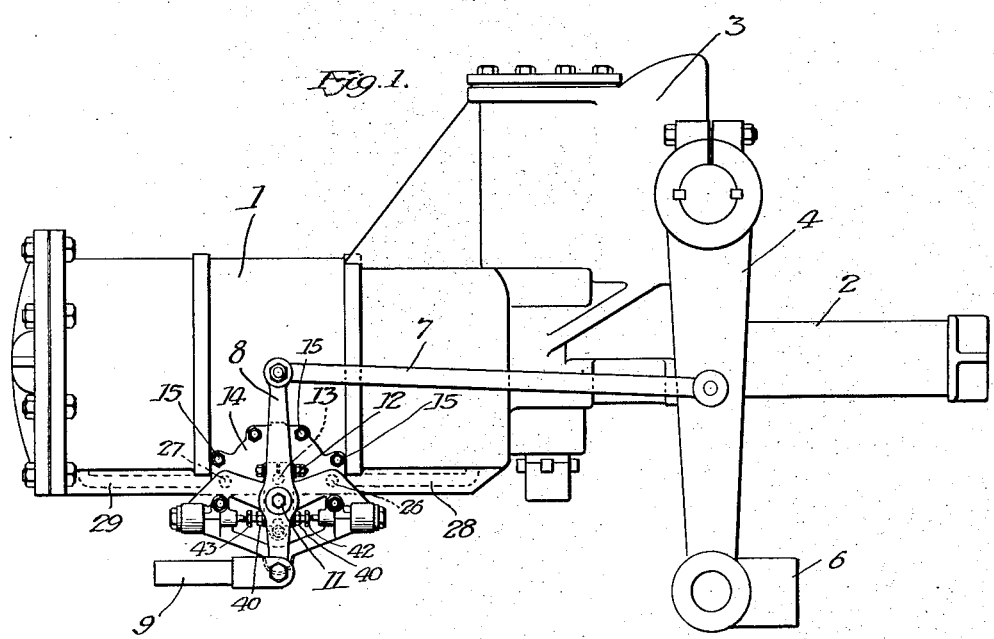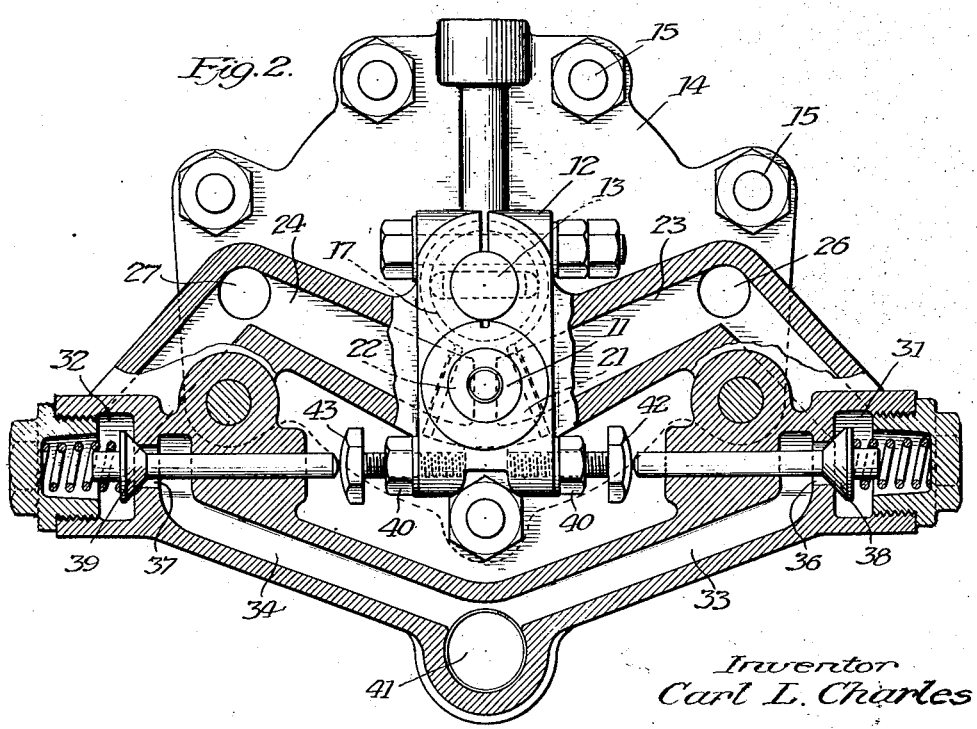

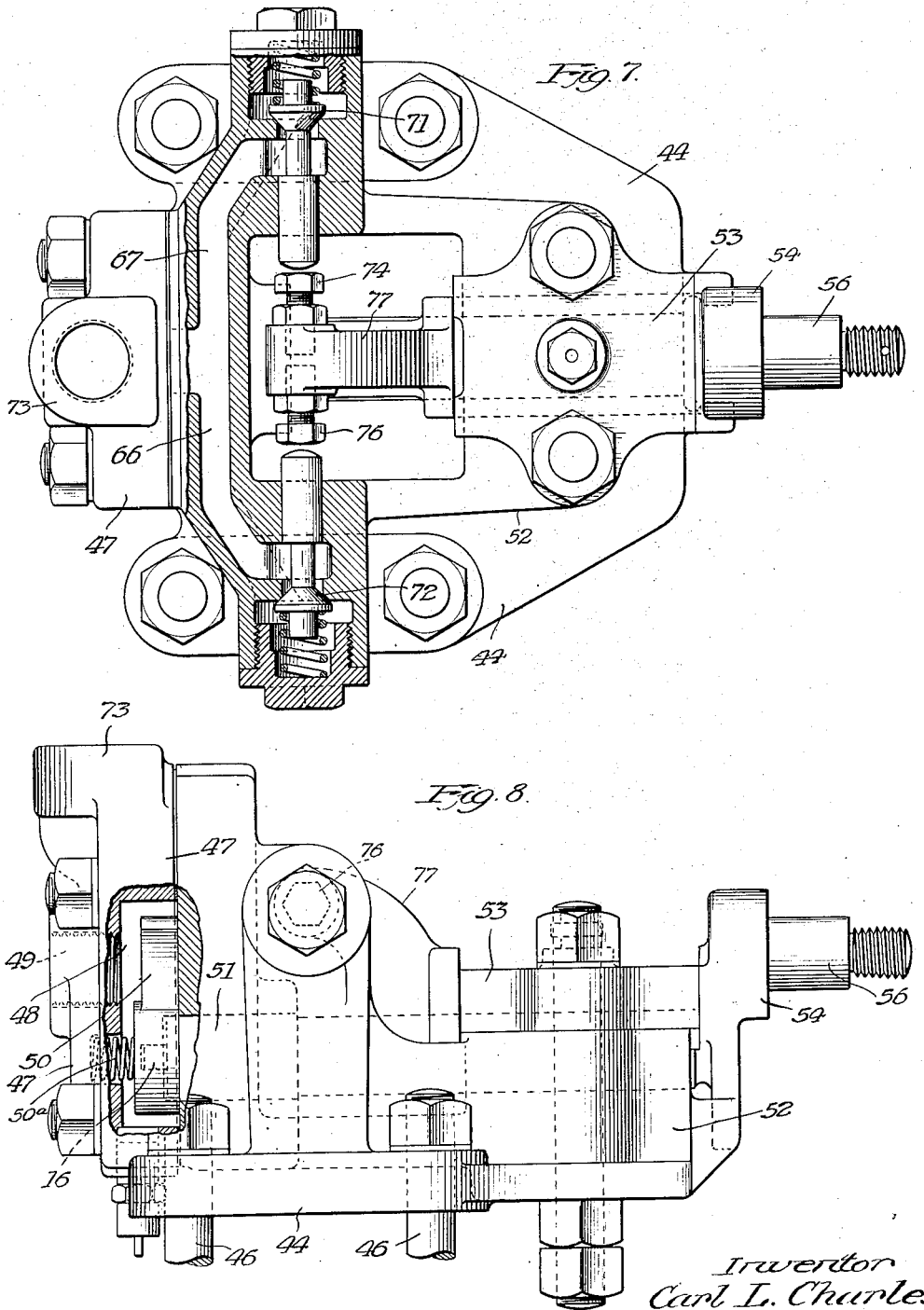

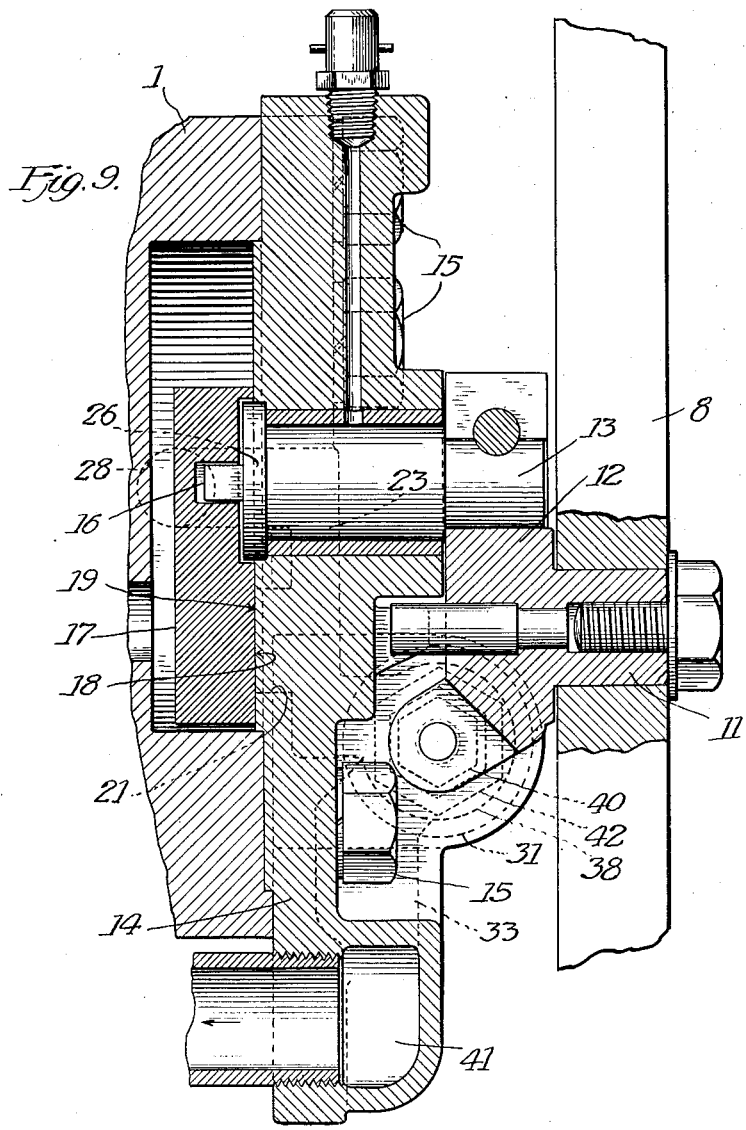

Patented Aug. 11, 1936

2,050,421

UNITED STATES PATENT OFFICE 2,050,421

REVERSE GEAR VALVE

Carl L. Charles, Chicago, Ill., assignor to Barco Manufacturing Co., Chicago, Ill., a corporation of Illinois Application August 3, 1932, Serial No. 627,318

1 Claim. (Cl. 121—41)

This invention relates to control valves particularly suitable for power reverse gears used for shifting the valve motions of locomotives, although other applications will be apparent to those skilled in this and allied arts.

Valves for this purpose should be sensitive and accurate and provide for positive yet flexible control of the reverse gear with maximum ease of operation. Sensitivity defines the ability of a power reverse gear promptly and accurately to respond or reposition itself in answer to a minimum and effortless movement of the reverse lever by the engineer. This performance in a reverse gear is a direct function of the sensitivity of its control valve.

It is the purpose of this invention to provide a compact valve capable of being readily assembled and disassembled, which excels in the above characteristics, particularly as to its sensitivity, and provides for close adjustment of the intake and exhaust valve actions, both individually and relatively to each other.

To accomplish the foregoing purposes I employ a novel valve arrangement embodying a rotary or slide valve in combination with one or more poppet valves for controlling the intake and exhaust ports of the reverse engine or gear, at least one of the valves being preferably adjustable with respect to itself and also with respect to the others. This combination and adjustment makes it possible to vary the time relation between the valves and results in a more sensitive and flexible, and yet positive control than was possible with prior control valves using a single non-adjustable rotary valve to cover all ports.

A more comprehensive understanding of my invention will be obtained from the following description given in connection with the drawings in which:

Fig. 1 is a side elevation of a power reverse gear employing a control valve constructed in accordance with this invention, Fig. 2 is an enlarged side elevation of the control valve with portions of the body cut away to illustrate the fluid passages therethrough and valve arrangement, Fig. 3 is a side elevation of the valve body removed illustrating the inlet ports and the rotary valve in position, Fig. 4 is a similar view with the rotary valve removed to illustrate the ports, Fig. 5 is a perspective of the rotary valve, Fig. 6 is a side elevation of a slightly modified form of a control valve with portions of the casing broken away to illustrate the interior construction, Fig. 7 is a plan view of the form of valve shown in Fig. 6, parts of the casing being broken away, and Fig. 8 is an end elevation of the latter valve.

Fig. 9 is a vertical cross section of Fig. 2.

Referring more particularly to Figs. 1 and 5, inclusive, there is illustrated a control valve designed as a replacement valve for the present valve used on "Barco" power reverse gears. It will be manifest that while the invention is illustrated as applied to this reverse gear, it may be made equally applicable to other reverse gears by suitable changes in the shape of the body.

The reverse gear shown comprises generally an engine cylinder I within which is a piston and piston rod (not shown) extending into a closed barrel 2. The gear is of the rack, pinion, worm and gear type, the latter elements being enclosed within the housing 3 and adapted to actuate reach arms 4 to which the reach rod 6 is connected. Pivotally secured to one of the reach arms intermediate its ends is the usual floating link 7 which is connected to the floating lever 8, the opposite end of which is connected to the reverse lever rod 9. Intermediate its ends the floating lever is pivoted upon a pin II projecting outwardly from the valve arm I2 which in turn is secured to the valve shaft I3 disposed above pivot pin II. The foregoing is standard reverse gear construction, showing for illustrative purposes only, and need not therefore be elaborated upon.

As shown, the valve mechanism is a detachable unit which may be secured to the side of the reverse gear and comprises a body or housing I4 attachable to the side of the engine cylinder by studs I5 and overlying a recess in the reverse gear body casing or cylinder to form a chamber 40 to which the fluid supply, usually air, is piped.

Secured to the inner end of shaft I3 by a tongue and socket connection I6, for limited axial movement but non-rotative movement thereon, is a rotary or slide valve I7, the inner face I8 of which seats against ground seating surface I9 of the valve body and is held thereagainst by the pressure of the fluid in the valve chamber. The valve is tadpole shape and of sufficient width to cover either or substantially both ports 2I and 22 (Fig. 4) which communicate with ducts 23 and 24 respectively (Fig. 2) formed in the valve body.

Ports 26 and 27 establish communication between the ducts and passages 28 and 29, respectively, formed in the engine cylinder wall and leading to opposite ends of the cylinder. Ducts 23 and 24 terminate at their outer ends in valve chambers 31 and 32, respectively, formed in the outer ends of the valve body which respectively communicate with passages 33 and 34 through valve ports 36 and 37 controlled by normally closed poppet valves 38 and 39, respectively. Passages 33 and 34 communicate at their inner ends with a common exhaust port 41.

The valve stems of valves 38 and 39 extend inwardly in position to be engaged by adjustable tappets 42 and 43 threaded into the opposite sides of the lower end of valve arm 12 carried by the rotary valve shaft. Thus both the rotary valve and the poppet valves are operated from the same shaft. The tappets are locked in adjusted position by lock nuts 40.

In the illustrated valve mechanism, rotary valve 17 controls the inlet ports 21 and 22 for admitting fluid under pressure to the ends of the cylinder through ducts 23 or 24, ports 26 or 27 and passages 28 or 29, depending upon the position of valve 17. While the rotary valve is illustrated as having slight clearance, as can be seen from Fig. 3, in order to balance the pressures upon both sides of the engine piston to hold the engine in set position, it will be understood that the valve may be of sufficient width to have a slight lap if desired or any intermediate relation of valve and seat port edges such as line and line.

The poppet valves 38 and 39 control the exhaust of the engine cylinder, the exhaust being through ducts 23 or 24, chambers 31 or 32, ports 36 or 37 and passages 33 or 34 into exhaust 41 depending upon which of the valves 38 and 39 is open.

As valve arm 12 is swung to the right, viewing Fig. 2, inlet port 22 will be open, thus establishing communication to the left end of cylinder 1 through duct 24, port 27 and passage 29. At this time exhaust valve 39 for this end of the cylinder is closed and exhaust valve 38 for the opposite end of cylinder 1 is open, thus exhausting that end through passage 28, port 26, duct 23, chamber 31, port 36, passage 33 and discharge 41.

When the valve arm 12 is moved to the left, the positions of the valves and the consequent operations will be reversed from those just described.

With the valve arm in central position both exhaust valves are closed and both ends of the cylinder are open to line pressure, due to the clearance on both sides of valve 17, i. e., the reverse engine is balanced because the pressure on both sides of the piston is equal and the reverse gear is not likely to be jarred from set position. As stated, valve 17 may be of sufficient width to provide for a lap and tappets 42 and 43 may be adjusted to hold exhaust valves 38 and 39 open in central position, if desired, and thus balance the engine. It is also conceivable that under certain conditions it may be desirable or at least not detrimental to adjust the tappets so as to hold the exhaust valves open in neutral or central position. In operation the valve arm and valves will assume the positions determined by the lever rod 9 which is controlled by the engineer in the cab of the locomotive or by automatic mechanism in the usual manner.

The form of my invention illustrated in Figs. 6 to 8, inclusive, embodies a valve mechanism designed for mounting upon the top of a reverse gear cylinder instead of upon the side thereof.

In this form of my invention the valve mechanism is also a detachable unit which may be secured to the top of the reverse gear and comprises a body 44 adapted to be secured to the top of the reverse gear cylinder by bolts 46. To one end of the body is secured a cap 47 cored out to provide the valve chamber 48 which is connected to a source of fluid pressure through an inlet 49. The rotary valve 50 within this chamber is carried upon the inner end of shaft 51 in such a manner as to permit limited axial movement but non-rotative movement thereon. The valve seats upon the outer ground face of body 44 and is urged thereagainst by a light spring 50ª and by the pressure of the fluid in the valve chamber. Shaft 51 is journalled in a projecting portion 52 of the body and is rotatively held in place by a cap 53. The outer end of the shaft is provided with an integral arm 54 carrying a pin 56 offset with respect to the center of shaft 51 and to which is attached the floating lever 8.

As in the previous form of invention, the body is cored to provide two passages 57 and 58 (Fig. 6) which terminate at one end in ports 21 and 22 (Fig. 6) respectively, in the valve seating face of the body. These ports are adapted to be selectively or completely closed by valve 50. In this instance the valve is shown as being of sufficient width to provide lap over both ports when in central position.

The opposite ends of passages 57 and 58 communicate with ports 59 and 61, respectively, which extend through the bottom of the body and communicate with passages in the cylinder of the engine leading to opposite ends thereof. Passages 57 and 58 also communicate at their outer ends with ducts 62 and 63 leading to valve chambers 64 and 65, respectively. Chambers 64 and 65 communicate with exhaust passages 66 and 67 through valve ports 68 and 69 which are controlled by poppet valves 71 and 72. Exhaust passages 66 and 67 communicate with a common exhaust outlet 73 formed in cap 47.

The stems of poppet valves 71 and 72 extend inwardly toward each other and are arranged to be engaged by adjustable tappets 74 and 76 threadedly carried by an arm 77 formed integrally upon shaft 51. The operation of this form of valve, shown in Figs. 6 to 8, is similar to the operation of the form shown in Figs. 1 to 5 with the exception that in the form shown in Figs. 6 to 8 the rotary valve is provided with lap, and will not be repeated.

The foregoing valve combination and arrangement illustrated in both forms of my invention results in numerous advantages over the old style of control valve. By utilizing poppet valves in combination with a rotary valve a very sensitive control is obtained due to the fact that there is a minimum of frictional resistance to operation of the valve, that is, by using poppet valves the rotary valve may be reduced in size since it need be of sufficient width to cover only two ports instead of at least four as is necessary in the old form of control valve using a single rotary valve for both intake and exhaust ports. Accordingly its contacting surface area is reduced, which lessens the resistance to the movement of the rotary valve. The poppet valves also provide for a quicker and fuller exhaust opening than rotary valves which, together with the reduction of frictional resistance to operation, increases the sensitivity of the reverse gear as a whole. The use of a poppet valve reduces the number of ports in the face of the rotary valve seat and accordingly eliminates the necessity of large laps. The adjustable tappet construction provides for very close adjustment not only of the exhaust valves or poppet valves per se, but of the timed relation of the opening and closing of the poppet valves relatively to the rotary valve and also provides for an exterior adjustment eliminating the necessity of disassembling the valve to replace or vary the size of the rotary valve in order to obtain an adjustment thereof. In other words, in my invention it is possible to vary the functions of the different valves by having different combinations of sequence with the valves operating at variable periods on the exhaust and inlet and being selectively lapped or leaded with retard or advance.

Many other advantages will be apparent to those skilled in the art to whom it will also be apparent that changes in the details of construction may be made without departing from the spirit and scope of my invention as defined in the claim appended hereto.

I claim:

In a control valve for a power operated reverse gear, a rotary inlet valve, a pair of ports controlled thereby for admitting motive fluid to the respective ends of the reverse gear cylinder, means for operating said rotary valve comprising a floating lever and a rocker shaft to which said rotary valve is directly connected and an arm on said rocker shaft to which said floating lever is pivoted eccentrically to said shaft, said floating lever having one end connected to manually operated means and its other end connected to means operated by the reverse gear, a pair of poppet valves operable by said arm for exhausting said cylinder ends, and means for adjusting the time of operation of said poppet valves in relation to said rotary valve.

CARL L. CHARLES.